No. 790,467. Patented May 23, 1905.

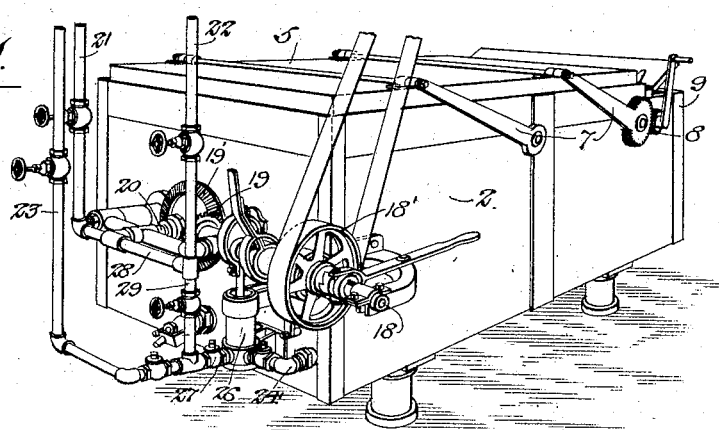
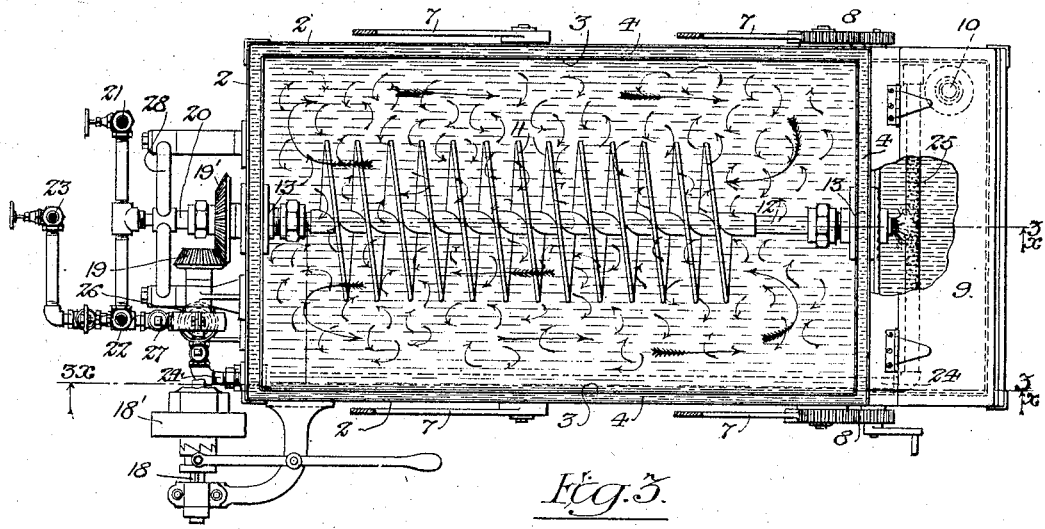
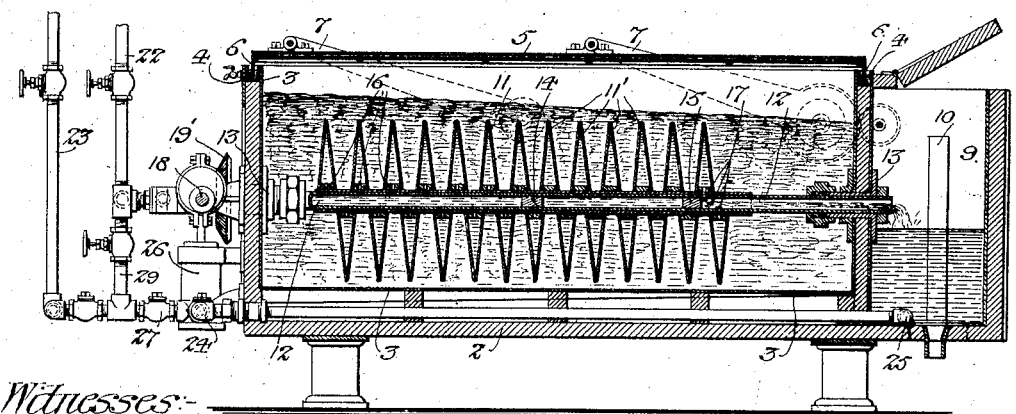

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ART OF RIPENING CREAM.

SPECIFICATION forming part of Letters Patent No. 790,467, dated May 23, 1905.

Application filed November 7, 1904. Serial No. 231,744.

*To all whom it may concern:*

Be it known that I, THEODORE L. VALERIUS, a citizen of the United States, residing at Fort Atkinson, Jefferson county, Wisconsin, have invented certain new and useful Improvements in the Art of Ripening Cream, of which the following is a specification.

My invention relates to that branch of the art of making butter which is known as the process of "ripening" cream, the purpose of which process is to prepare the butter-fat and serum of cream for separation in the churn, also to impart the necessary butter flavor thereto, and, further, to harden the butter particles and to give firmness or proper body to the butter product. My invention has special reference to improvements in this art as practiced in large creameries or butter factories.

The object of my invention is to render the ripening of cream possible by definite steps which shall constitute an active, positive, controllable, and yet variable process capable of producing certain and exact results from a single or several quantities or batches of cream taken at any stage or stages of primary fermentation, as contrasted with the uncertain, permissive, or passive so-called "natural" processes practiced hitherto and the stages and effects whereof have always been indeterminate and problematical.

It is well known that butter can be produced from sweet milk or cream; but there is little demand in this country for such butter, as it lacks the well-known butter flavor. To procure the desired flavor in the butter, it is necessary to sour, ferment, or ripen the cream before it is churned. The beneficial fermentation in cream is brought about by the existence and development therein of so-called "lactic bacteria," evidenced by the formation of lactic acid. It is also known that other bacteria which detrimentally affect the cream and its flavor exist therein, and while my process has to do with the elimination thereof the process and the manner of carrying out the same will be clearly understood if reference is made only to the lactic ferment or bacteria. Therefore the objectionable growths will be only incidentally treated of herein. It is commonly accepted that the lactic bacteria predominate and that the same subsist upon the milk-sugar, breaking it down into lactic acid and giving the cream a sour taste. The flavor, however, appears to be dependent upon certain by-products which accompany fermentation. What these by-products are is not definitely known; but that they exist and affect the ultimate product appears to be proven by the fact that butter made from cream that is artificially soured by the addition of lactic acid does not have the desirable butter flavor. It will be seen, therefore, that the ripening of cream is requisite to the production of acceptable butter. Fermentation also improves the cream by rendering its fatty components more readily and completely separable from the serum of the cream.

The process as generally practiced is simple in the extreme. A batch or a quantity of several batches of cream being placed in a vat, called a "ripener," from ten to twenty per cent. of lactic-acid ferment, called "starter," is added and gently stirred into the mass. Some means are then employed to give the mass a temperature which will permit fermentation to take place. This temperature varies, being from 50° to 75°, according to the length of time that the cream must stand before being churned.

The tempering means—ice, water-jackets, or coils, arranged about or in the vat—are depended upon to hold the temperature during the period of fermentation and, further, are used to lower the temperature for one or more hours after the cream has ripened and before it goes to the churn. It has been customary to allow the cream to stand in the ripener or vat for twelve or more hours—usually overnight—during which time it attains the condition of ripeness.

It may be said that the churning of cream has been reduced substantially to a known and certain process and that uniformly good results are obtained wherever fully-ripened and properly-tempered cream is used. The cooling of the cream is a step or stage in both the ripening and churning processes, and it should be understood that the degree to which the butter-fat will be separated from the other constituents of cream and also the firmness or "body" of the butter produced depend to a great extent upon the temperature at which the cream enters the churn and is maintained therein. Unless the butter-fat in the cream is of the same temperature as the serum and if the temperature of the fermented cream much exceeds 50° Fahrenheit the final product will lack proper grain and firmness of body or consistency. As the ripening process directly precedes the churning process, it has been the custom to regard the final tempering of the cream as a part of the ripening process, and this step will be referred to in that connection hereinafter.

What has been said with regard to the certainty and efficiency of the well-known process of churning cream cannot be said of any of the known processes or methods of ripening cream. Until recently little has been known of this art, and it has been regarded as a natural process, only slightly responsive to manipulation and control. Different butter-makers practice the art in somewhat different ways, each being led by the preponderance of successes over failures attaching to his chosen method. It is well-known that many batches of cream are partially or wholly lost by even the most careful butter-makers from unknown conjectural causes. I take it that the fact that the quality of the product of the churn is dependent upon the churning temperature has led butter-makers to this conclusion: that fermentation is also dependent upon temperature. So far is this the case that it is generally stated and conceded that the process is extremely uncertain, but that if the temperature of the fermenting cream could be controlled and fixed as desired at all times the results would be uniformly good. During recent years all cream-ripeners have been constructed with this idea in view. Nevertheless the failures continue, and many butter-makers after trying complicated machines have returned to the old-style vats as being quite as successful and at the same time simpler to operate. Thus the failures are still being charged to the lack of proper means for varying and maintaining the temperature of the body of cream.

My conception of a proper ripening process is of one in which temperature plays a part, but in which the condition of the cream at the initiation of and during fermentation plays a larger and the most important part in producing butter of uniformly high grade. My experiments with the old processes, together with those made in accordance with my said conception, conclusively show that the old theory pertaining to temperature is untrue and prove that the tempering of the cream and the specified time to be allowed for fermentation are wholly secondary, considered as features of the process. While, as explained, the common process is frequently varied in slight details, its characterizing features have always been time and temperature, to which has been added in later years the step of inoculating the cream with previously-prepared starter or ferment. The use of the starter accounts for the marked difference in the taste or flavor of so-called "creamery butter" and the farm product; but there still remains an unaccounted for lack of uniformity in the creamery product.

Fermentation as such in perfectly fresh cream depends upon three things: first, the quantity of bacteria originally contained in the cream and added thereto in the ferment or starter; second, the quantity of nutriment contained in the cream upon which the bacteria may thrive, and, third, the temperature of the cream. Fermentation will proceed in cream at temperatures but slightly exceeding the freezing-point; but temperatures from 50° to 120° Fahrenheit promote or accelerate the growth and action of the lactic bacteria, while excessive temperatures operate to check fermentation. Complete uniform fermentation is the end desired, and these statements are true and also comprehensive when considered in the abstract; but I find that knowledge and concrete application thereof do not lead to complete or uniform fermentation. The vital fault which I find to exist in a body of cream is that it is not uniform in quality and consistency, physically considered, and because of this fact the ordinary process can never produce a uniformly fermented or ripened product. It is obvious that a uniform high grade or quality of butter cannot be produced from non-uniform cream. The state of fermentation or the ripeness of the cream is adjudged by the expert tasting thereof or by a rough quantitative test for lactic acid, and it is by such a test that the butter-maker determines the time when fermentation should be checked. Ripening cream is rarely tested, except during the final stages of fermentation.

If sterile cream should be inoculated with a perfectly pure culture of lactic-acid-forming bacteria and allowed to ferment, care being taken to exclude outside contamination, the acidity would in time develop to a point between .6 and .8 per cent., after which no further change would take place, it being a well-known fact that an excess of lactic acid produced inhibits the growth of and finally destroys the organisms that produced it. In this case, there being no putrefactive germs present, putrefaction cannot occur; but, as before stated, there are always a greater or less number of putrefactive organisms present, the growth of which is checked during the primary fermentation, due to the fact that the conditions are more favorable to the growth of those of the lactic-acid type. Hence when the nutriment upon which the lactic bacteria subsist becomes exhausted in any portion of a mass of cream or when lactic acid has developed sufficiently to exterminate the lactic bacteria then putrefaction sets in, with contaminative effect, and the butter-maker having learned the approximate acid condition of the cream preceding the state of putrefaction attempts to check fermentation before this state is reached. As explained, this is accomplished by lowering the temperature, a step which is incidentally reciprocal with that of the hardening of the butter-fat particles preparatory to churning. Water-cooled coils or vanes may be moved about or rotated in the mass after the cream has been ripened for the purpose of more quickly reducing its temperature. The agitation of the cream is at all times limited by its tendency to be churned, and the movable cooling devices heretofore used have either been of a shape to only slightly agitate the mass or have been moved very slowly to avoid churning the cream. In all cases the movable coolers or tempering devices have operated to simply cut paths in the thick pasty cream without agitating the mass, the fatty portions being expelled and the thin serum occupying the paths of the cooler's arms, vanes, or sections. For these reasons the general stirring or agitation of the mass of cream which I deem necessary has never been accomplished.

Natural cream is an emulsion, and when a mixture of cream and starter-fluid is set in a vat the differences in specific gravity cause the butter-fat, the serum, and the starter fluid to separate. Thus the upper portions of the mass soon become rich in the butter-fat, while the greater part of the lower portion is composed of serum containing most of the bacteria. In testing cream for acidity it is customary to take samples of the upper portions of the fermenting cream, yet the lower portions I have always found (through use of proper instruments) to contain larger percentages of lactic acid, and herein lies the chief source of failure, the evidences being that putrefaction frequently sets in in the lower parts of a mass of cream before the upper portion has attained sufficient acidity to cause the butter-maker to lower the temperature. As soon as any part of the cream becomes fully ripe the lactic-acid-producing organisms cease to grow, giving a clear field to those of the putrefactive type, and the cream putrefies rapidly, with disastrous effect on the butter flavor. It will be readily seen that in case cream is churned different parts of which have attained different degrees of ripeness some being comparatively sweet, some properly fermented, while still other parts have reached a stage of putrefaction the resultant butter will not be uniform, but will be a mixture of many different butters having different flavors, the whole being of very inferior quality, all due to lack of uniformity in the cream.

The ripening of fresh cream is uncertain, and much difficulty and uncertainty has attended the use of pasteurized cream; but the greatest difficulties are encountered in attempting to ripen gathered cream. The term "gathered" indicates that the cream has been separated by the patrons and almost invariably means that the different quantities of cream furnished to a butter-maker in a single day are of different ages, therefore in different stages of fermentation. When a quantity of gathered cream is placed in a vat, the different batches do not merge or blend; but because of the pasty, thick, and sometimes leathery condition of the cream substantially retain their identity, each, so to speak, constituting a separate bacteriological culture. Although it is the practice to add large quantities of starter to gathered cream, the ripening of such a mass and the determination of the time when fermentation should be stopped may be aptly described as "guesswork," and it has been impossible to produce high-grade butter from gathered cream, because many portions of such a body of cream inevitably became overripe whenever it was attempted to carry the major portion of the mass to a state of standard acidity.

The deficiencies, faults, and limitations of the known processes being now understood, the specific object of this invention may be stated to be the provision of a process including the necessary and purely natural features of fermentation and which shall positively insure a condition of uniformity of composition and consistency throughout the mass under treatment.

As contrasted with the passive or permissive processes hitherto employed in the ripening of cream my invention resides in a positively-controlled manipulative process comprising steps which first cause the uniform distribution of the lactic bacteria through the mass under treatment and which further operate to reduce the mass to a condition of physical uniformity, smoothing out or breaking up all thick or clotted portions of the body.

Further steps of my process consist in testing the mass to determine its initial acidity and the uniform tempering thereof to promote fermentation, followed by a reduction of temperature and the continued mixing and smoothing of the cream to finally prepare it for the churn; and, further, my invention consists in other and specific steps included in and in addition to the foregoing, all as hereinafter described, and particularly pointed out in the claims.

My novel process will be more readily understood by reference to the accompanying drawings, in which I have illustrated apparatus for carrying out my process and the efficiency of which apparatus I have demonstrated.

Figure 1 is a perspective view of a cream emulsifying, ripening, and refrigerating machine or apparatus adapted to the carrying out of several of the steps of the herein-described process. Fig. 2 is a plan view of the machine, the cover being removed to disclose the contained body of cream and the rotary emulsifying and tempering device; and Fig. 3 is a vertical section of the machine substantially on the line $3^{\times} 3^{\times}$ of Fig. 2, the section being irregular in several planes to show the various parts of the machine.

The machine herein illustrated is described and claimed in certain applications now pending in the Patent Office and which I filed upon the following dates: August 29, 1904, September 13, 1904, September 13, 1904, and September 13, 1904. Serial numbers of the foregoing applications are, respectively, 222,578, 224,237, 224,325, and 224,326.

My process is intended for use in large creameries or butter factories where large quantities of cream composed of many different lots or batches must be ripened simultaneously. The machine illustrated has capacity for several tons of cream. The vat or tank is provided with a cover and contains mechanisms for agitating and tempering the thick pasty cream with which the vat is filled.

Referring now to the drawings, 2 represents the vat, provided with a metal lining 3. The top of the vat contains a water groove or channel 4, and 5 represents a cover having a flange 6, which when the cover is closed extends into the water in the groove 4 and nearly to the bottom of the said groove. Arms 7 and the mechanism 8 are used for raising, lowering, and supporting the cover 5. On the end of the vat is a relatively smaller tank 9 to contain ice and water.

10 is an overflow-pipe.

The tempering and agitating device comprises a hollow spiral 11, through which warm and cold fluids are caused to flow. The spiral is of much less diameter than the width of the vat, and said diameter is also less than the depth of the vat, the operation being more satisfactory when the spiral is completely immersed in the cream. The spiral 11 is composed of a large number of thin sheet-metal disks 11' obverse and reverse in relation to each other, the same forming within a spiral space or channel that is substantially triangular in cross-section. The sheet-metal hollow spiral is mounted upon a hollow shaft 12. This shaft is provided with bearings 13 13 in the ends of the vat and contains plugs or partitions 14 15.

16 16 represent holes in the shaft communicating with the duct or passage within the hollow spiral, and 17 17 represent holes through which the contents of the spiral is discharged into the rear end of the hollow shaft, from thence to flow into the tank 9. On the front end of the vat is a driving mechanism arranged in a suitable frame on bearings attached thereto and preferably comprising a transverse shaft carrying a driving-pulley 18' and connected to the shaft 18 by bevel-gears 19 19'. The spiral may be rotated in either direction, but is preferably arranged nearer the front than the rear end of the vat, and is so rotated that the cream is caused to flow in the direction of the large arrows shown in Fig. 2.

20 is a properly-packed liquid connection with the front end of the spiral shaft. To this I attach water and steam and brine connections.

21 represents a valved steam-pipe.

22 represents a valved brine-pipe.

23 represents a valved pipe through which brine may be returned to the brine-tank.

24 is a pipe extending from a strainer 25 in the tank 9 to a pump 26, that is operated by the transverse shaft referred to.

27 is the delivery-pipe of the pump, connected to the common pipe 28 by valved pipe 29.

The pipes 23, 24, and 27 all contain check-valves. By manipulating the several hand-valves either steam, warm water, cold water, or brine may be supplied to the rotary spiral within the vat. The pump when in motion operates to circulate the contents of the tank 9 through the spiral. The movement of the tempering fluid is from the hollow shaft 12 through holes 16 into the spiral passage, thence through said passage to the discharge-holes 17 and the rear end of the hollow shaft, where the fluid is discharged to the tank 9. It will be obvious that the thin-walled spiral may be caused to take on any desired temperature. Further, the external walls of the spiral are regular and smooth and of a very large area, and for this reason the spiral may be rotated at a comparatively high speed without subjecting the cream in which it is immersed to any force tending to beat the cream or elevate or dash it about in the vat. The rotating spiral serves as a propeller and causes the cream to circulate rapidly in the vat. The circulation of the cream in the vat is neither regular nor systematic. Though its major movement is longitudinal, the spiral which produces such movement also tends to force the cream toward the bottom and sides of the vat. Thus conflicting currents are set up within the body of cream, the action of which in the vat gives it the appearance of a boiling mass. This action results in the aeration of every particle of the cream through its exposure at the surface, and aeration takes place whether or not the cover of the vat is in place, the cover-joint being such as to afford free communication with the external atmosphere, while excluding dust and insects. The agitation, boiling, and circulation of the cream in the vat forces every particle many times into contact with the smooth tempered walls of the spiral, and in this manner the mass is quickly made to take on approximately the temperature of said spiral. The spiral also operates directly upon the cream to smooth or break up all clots and leathery particles, and this direct action, coupled with the circulation and agitation of the mass, the latter overcoming the tendency to separation due to the different specific gravities of the constituents of the cream, soon reduces the whole body of cream to a condition of uniform composition or consistency, which in addition, because of the physical equalization occasioned, will be of uniform temperature throughout.

It should be noted that the form of the agitating, tempering, and emulsifying device is such as to attack and move every portion of the mass, so that no part is left without physical treatment thereby, as where rotary arms, coils, or vanes are used.

Such are the constructions and functions of the several parts of the machine. Undoubtedly other means may be devised for carrying out my process; but of all with which I am familiar I prefer the machine here illustrated.

Proceeding now to the consideration of the process, the steps and the order thereof may be recited as follows:

First. The cream is placed in the vat.

Second. The starter is added to the mass.

Third. The temperature of the mass is lowered to a point where fermentation will be very slow. During the same period the starting fluid (fluid containing lactic bacteria) is uniformly distributed in the mass, there occurring at the same time the equal distribution of the different fermentive growths contained in the various original lots or quantities of cream composing the mass. Again, during this period the cream is reduced to a smooth, even, and uniform consistency, considered from the standpoint of its own physical condition. In short, the third step consists in the positive reduction of the whole mass to substantially a perfect emulsion, having the same low temperature throughout. The cream is then ready to be fermented or ripened, and then follows:

Fourth. The step of testing the cream to ascertain its condition and determine just what treatment it requires in the way of further fermentation.

Fifth. The temperature of the emulsion is raised to accelerate fermentation, and the higher temperature is maintained until a test shows that the maximum acidity has been closely approached.

Sixth. And, finally, the fermented cream is further emulsified and cooled to check fermentation and is held at a low temperature until the whole mass acquires the proper churning temperature. A step incident to the emulsification of the mass is the aeration thereof, the purpose of which is to rid the cream of noxious and deleterious odors and flavors. None of these steps have the effect of churning the cream.

It will be obvious that the several steps of my process may be merged or incorporated into fewer steps, and I do not intend herein or hereby to confine my invention to a process in which the steps recited are observably distinct.

The specific preferred way of conducting the process is as follows: The vat being made ready, the cream is dumped into it direct from the separators or as fast as it arrives at the creamery. When enough cream has accumulated in the bottom of the vat to partly immerse the tempering device, the latter is started into motion. At this time I reduce the temperature of the spiral to abstract the heat of the cream and lower its temperature to approximately 45° Fahrenheit. This temperature depends upon the temperature of the well-water, ice-water, or brine which is used in the rotary spiral, and by a low temperature I mean that which will impede or substantially stop fermentation. By agitating and circulating the contents of the vat the temperature is equalized, and I find that it is especially desirable to immediately begin the breaking down of all differences of temperature in the mass. I employ the same action to smooth the cream—that is, all clotted, thick, or leathery portions of the cream are quickly torn or broken up by coming into contact with the surface of the spiral, and when thus separated are evenly diffused or disseminated within the mass. The operation is that of blending the constituent quantities of cream, and thus effectually destroying their identity. By causing the cream to boil vigorously every part is within a brief period aerated or exposed to the atmosphere, and in this manner I rid the cream of noxious elements during the early stage of the process. The performance of those steps or operations continues throughout the time that the vat is being filled with cream and for a considerable period thereafter and is depended upon to reduce the mass to a single temperature and to a smooth, even, and uniform condition, reference being here made to the physical composition of the mass. This initial treatment of the cream usually occupies from twenty to sixty minutes, according to the temperature and character of the cream placed in the vat. When all conditions have been equalized and made uniform throughout the body of cream, the starter fluid is poured into the vat. It will be understood that at this moment the whole body of cream is in motion, and the starter fluid is therefore quickly taken up by the many and conflicting currents in the mass and is uniformly distributed therethrough. It should be understood that meantime the blending of the original lots of cream will have equalized the distribution of the original bacteria therein, and the emulsification of the mass continuing a test of the quality of any portion thereof may soon be taken to accurately represent the quality of the mass as a whole. The low temperature of the cream up to this time effectually checks fermentation and affords the opportunity and time for the thorough and equal distribution of the acidulated serum of the cream. The test referred to may be of any desired nature, but is usually a quantitative determination or analysis for lactic acid. Assuming that the cream used is substantially fresh, the percentage of lactic acid which it is found to contain at the end of the initial period of treatment will be low, while in the case of a large batch of gathered cream the percentage may be as great as .4 to .45 per cent. It is commonly assumed that .6 per cent of lactic acid indicates the limit of lactic fermentation, and the purpose of the process, specifically considered, is to raise the acidity of the cream to that or approximately that point. The butter-maker having by the test of a small quantity of cream taken from the mass determined the condition of the whole mass is now able to correctly fix upon the treatment required for the complete fermentation of the cream. This involves the next step of the process, which consists in raising the temperature of the cream to approximately 75° to 85° Fahrenheit, depending upon the acidulous condition of the mass and the length of time which the butter-maker desires to devote to the fermentation of the cream. With the machine described the increase of temperature is accomplished by turning warm fluid into the rotary spiral, which, becoming warm, quickly and uniformly communicates heat to every part and particle of the surging boiling body of cream. The higher temperature accelerates the growth of bacteria—in other words, hastens fermentation. I prefer in carrying out my process to stop the emulsifying and tempering device when the proper temperature has been reached and permit the mass to remain substantially quiet during the period of active fermentation. I may, however, in this connection direct attention to the fact that if the temperature of the cream is high the agitation may be continued without perceptibly retarding fermentation. The period of active fermentation is short, my preference being to confine this portion of my process to approximately half an hour. From time to time during this period I test the cream by tasting it or otherwise gage or ascertain its acidity and check the action as soon as a standard six-tenths-per-cent. acidity is approximated. This operation consists in quickly reducing the temperature of the mass and in practice is accomplished by shutting off the warm fluid from the spiral and pumping cold water or brine therethrough. The rotation and the heat-absorbing effect of the spiral result in the lowering of the temperature of the cream to about 50° Fahrenheit, and I usually continue to cool the ripened cream for one or more hours until the contained butter-fat is thoroughly hardened. If the cream must be held in the vat for a considerable period before it is churned, I lower the temperature to about 40°—in other words, practically refrigerate the cream. In such a case the cream should be heated slightly before removing it from the vat to churn. It is preferable to maintain the body as a perfect emulsion until it is placed in the churn, and I usually operate the spiral during the whole of the cooling or final period of the process, though this is not absolutely essential. It sometimes happens in using gathered cream that the cream is practically ripe when placed in the vat, and in such cases the fermentive step proper of the process will be dispensed with, all of the advantages desired being secured by the simple emulsification of the mass with the flavoring starter fluid.

From the foregoing it will be seen that my process is differentiated from all others in two very important particulars—to wit, all uncertainty regarding the exact character and nature of the mass under treatment considered as a workable whole is avoided by first positively preparing the cream to receive the beneficial effect of the starter or ferment, and, second, the liklihood of uneven fermentation is positively avoided by uniformly interchanging and distributing the ferment and practically maintaining the uniform conditions throughout the whole process. These departures from old methods make it possible for the butter-maker to know with certainty the condition of the cream at all times and serve to remove the process of ripening cream from the field of doubt and conjecture to that of exact knowledge and assurance. The reduction of the various batches or lots of cream of all kinds and qualities to a single uniform blend or composition of known quality and the maintenance of the blended condition at all temperatures affords a proper basis for further treatment that ultimates in a uniformly ripened and hardened product and butter of dependably high grade. The loss avoided in the single instance of gathered cream makes the process of great value to those practicing the art.

It is obvious that my process is capable of modification in its minor features, and I therefore do not confine my invention to the specific steps herein described.

Having thus described my invention, I claim as new and desire to secure by Letters Patent—

1. The herein-described improvement in the art of ripening a mass of cream which is composed of numerous individual quantities, that consists in first adjusting the temperature of the mass and equalizing all conditions existant therein and then fermenting the mass, thereafter substantially refrigerating it to check fermentation and hardening the butter particles, all without churning the cream and preparatory to the churning thereof, substantially as described.

2. The herein-described improvement in the art of ripening cream that consists in mixing the cream and starter fluid and thoroughly emulsifying the mixture, then determining the condition of the cream, then accelerating fermentation therein, and thereafter reducing the temperature of the cream to check fermentation and harden the butter particles, all preparatory to churning the cream, substantially as described.

3. The herein-described improvement in the art of ripening cream, that consists in admixing cream and lactic ferment, then thoroughly emulsifying the mixture and simultaneously smoothing and aerating the cream, thereby equalizing the temperature throughout the mass and reducing the cream to a uniform consistency, and then causing the active fermentation of the cream, substantially as described.

4. The herein-described improvement in the art of ripening cream, that consists in thoroughly emulsifying numerous quantities of cream, thereby reducing the mass to a condition of uniform consistency and then fermenting the same, substantially as described.

5. The herein-described improvement in the art of ripening cream, that consists in first producing an emulsion of substantially uniform consistency from various quantities or batches of cream, then emulsifying the same with lactic ferment, then uniformly increasing the temperature of the mass uniformly throughout and thereafter uniformly reducing the temperature of the mass, all without churning the cream, substantially as described.

6. The herein-described improvement in the art of ripening cream, that consists in admixing numerous lots or batches of cream with lactic ferment and then inducing circulatory movement and a boiling action within the mass to emulsify the same, without churning the cream, and thereafter uniformly tempering and fermenting the cream, substantially as described.

7. The herein-described improvement in the art of preparing various lots of cream for simultaneous fermentation, which consists in smoothing and emulsifying the mass comprising said lots and equalizing the temperature thereof and the distribution of the bacteria therein, substantially as described.

8. The herein-described improvement in the art of ripening cream, that consists in first producing an emulsion of cream and lactic ferment, through the agency of internal circulation and agitation, then determining the acidity of the cream, then accelerating the fermentation thereof until maximum acidity is approximated, and then cooling the mass and further emulsifying the same, thereby checking fermentation and hardening the butter particles, substantially as described.

9. The herein-described improvement in the art of ripening cream that consists in mixing cream and lactic ferment in a suitable vat, then inclosing the mass in said vat, then emulsifying the mass by non-churning circulation and agitation of the cream within the vat, then uniformly increasing the temperature of the mass to permit fermentation, and thereafter by continued agitation and the lowering of the temperature of the mass checking fermentation therein and hardening the butter particles preparatory to churning, substantially as described.

10. The herein-described process of ripening cream, that consists in placing together various lots of cream and emulsifying, smoothing and aerating the same with lactic ferment, then determining the fermentive treatment required, and then accelerating fermentation by application of heat, substantially as described.

In witness whereof I have hereunto set my hand, this 24th day of October, 1904, at Chicago, Cook county, Illinois, in the presence of two witnesses.

THEODORE L. VALERIUS.

Witnesses:
CHARLES GILBERT HAWLEY,
JOHN R. LEFEVRE.